(12) United States Patent
Dunham et al.

(10) Patent No.: US 10,035,444 B2
(45) Date of Patent: Jul. 31, 2018

(54) CUP HOLDER ASSEMBLIES

(71) Applicant: Ford Global Technologies, LLC, Dearborn, MI (US)

(72) Inventors: Scott Holmes Dunham, Redford, MI (US); Kathleen M. Parlow, Columbus, MI (US); John Louis Miklas, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/248,269

(22) Filed: Aug. 26, 2016

(65) Prior Publication Data
US 2016/0362031 A1 Dec. 15, 2016

Related U.S. Application Data

(62) Division of application No. 14/628,666, filed on Feb. 23, 2015, now Pat. No. 9,440,573.

(51) Int. Cl.
*B60N 3/10* (2006.01)

(52) U.S. Cl.
CPC ............ *B60N 3/102* (2013.01); *B60N 3/107* (2013.01)

(58) Field of Classification Search
CPC .............. B60N 3/10; B60N 3/102; B60R 7/04
USPC .................................. 296/1.08, 37.1, 37.12
See application file for complete search history.

(56) References Cited

U.S. PATENT DOCUMENTS

| 4,191,350 | A | * | 3/1980 | Ormond | A01K 97/04 |
| | | | | | 248/292.13 |
| 4,434,961 | A | * | 3/1984 | Hoye | B60N 3/10 |
| | | | | | 108/44 |
| 4,583,707 | A | | 4/1986 | Anderson | |
| 5,060,899 | A | | 10/1991 | Lorence | |
| 5,072,909 | A | | 12/1991 | Huang et al. | |
| 5,087,008 | A | | 2/1992 | Miller | |
| 5,104,186 | A | * | 4/1992 | Kwasnik | B60N 2/4606 |
| | | | | | 248/311.2 |
| 5,106,003 | A | * | 4/1992 | Ma | B60N 3/002 |
| | | | | | 108/44 |
| 5,195,711 | A | | 3/1993 | Miller | |
| 5,325,991 | A | * | 7/1994 | Williams | A45F 5/02 |
| | | | | | 215/12.1 |
| 5,330,146 | A | | 7/1994 | Spykerman | |
| 5,445,350 | A | | 8/1995 | Rigsby | |
| 5,573,214 | A | | 11/1996 | Jones et al. | |
| 5,639,052 | A | | 6/1997 | Sauve | |
| 6,024,395 | A | * | 2/2000 | Kang | B60N 3/102 |
| | | | | | 296/37.1 |

(Continued)

FOREIGN PATENT DOCUMENTS

DE 10337525 A1 3/2004
DE 102005024591 A1 11/2006
(Continued)

*Primary Examiner* — Hilary L Gutman
(74) *Attorney, Agent, or Firm* — Vichit Chea; Brooks Kushman P.C.

(57) ABSTRACT

A cup holder assembly includes a pair of planar bodies each defining a rim, and a pair of fabric pouches that are each attached to one of the rims. The planar bodies are pivotably attached to each other and are configured such that, in a folded position, the rims are stacked and the fabric pouches are nested within each other, and in a deployed position, the rims and fabric pouches are side-by-side.

7 Claims, 3 Drawing Sheets

(56) References Cited

U.S. PATENT DOCUMENTS

| | | | |
|---|---|---|---|
| 6,045,017 A * | 4/2000 | Connell | A45F 5/02 |
| | | | 224/148.4 |
| 6,349,913 B1 * | 2/2002 | Jankowski | B60N 3/108 |
| | | | 224/281 |
| 6,405,881 B1 | 6/2002 | Park | |
| D461,996 S * | 8/2002 | Liao | D7/620 |
| 6,520,366 B1 * | 2/2003 | Bradley | A47G 19/065 |
| | | | 220/23.2 |
| D639,124 S * | 6/2011 | Byun | D6/716.2 |
| 8,066,148 B2 | 11/2011 | Garahan | |
| 8,474,772 B2 | 7/2013 | Miklas | |
| 8,573,553 B2 | 11/2013 | Stephan | |
| 8,573,668 B2 * | 11/2013 | Miklas | B60N 3/10 |
| | | | 248/311.2 |
| 8,641,004 B2 | 2/2014 | Miklas | |
| 2002/0145096 A1 * | 10/2002 | Eubanks | A47G 23/0225 |
| | | | 248/311.2 |
| 2005/0167557 A1 * | 8/2005 | Winckels | B65D 81/05 |
| | | | 248/311.2 |
| 2009/0095765 A1 * | 4/2009 | Guard | A47G 23/0225 |
| | | | 220/739 |
| 2013/0126691 A1 * | 5/2013 | Miklas | B60N 3/102 |
| | | | 248/311.2 |
| 2014/0084116 A1 | 3/2014 | Brunard et al. | |

FOREIGN PATENT DOCUMENTS

| | | |
|---|---|---|
| DE | 102007045614 A1 | 4/2009 |
| DE | 102008061228 A1 | 6/2010 |
| DE | 102009043071 A1 | 3/2011 |
| DE | 102010016574 A1 | 10/2011 |
| DE | 102010031597 A1 | 1/2012 |
| DE | 102014219067 A1 | 3/2016 |
| EP | 1393969 A1 | 3/2004 |
| EP | 1584515 A2 | 2/2011 |
| FR | 2978095 A1 | 1/2013 |
| JP | 3402417 B2 | 5/2003 |

* cited by examiner

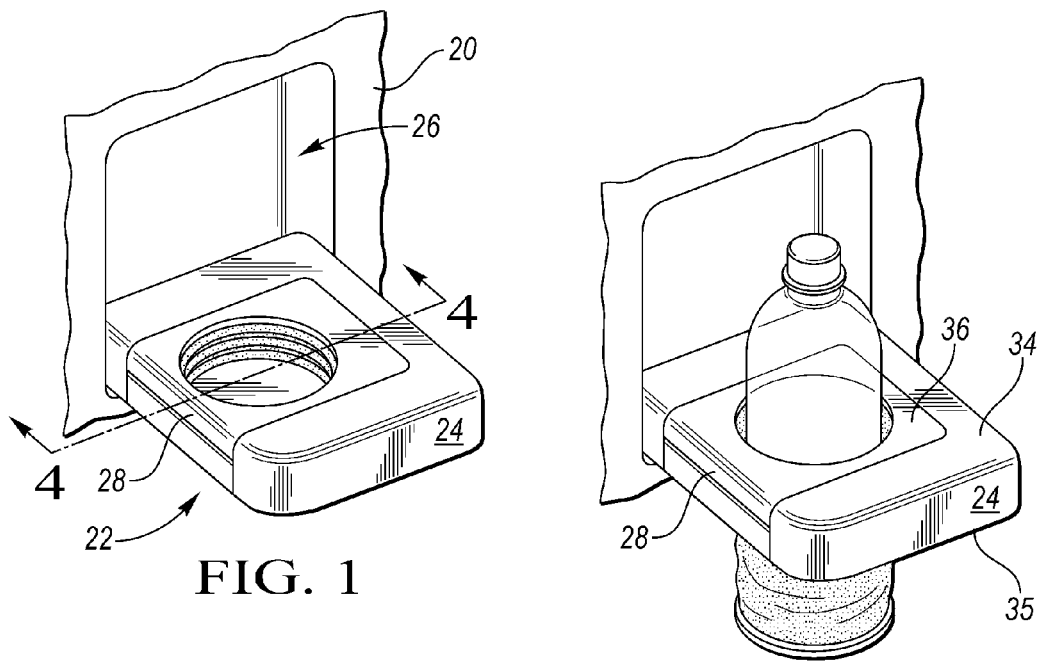
FIG. 1
FIG. 2
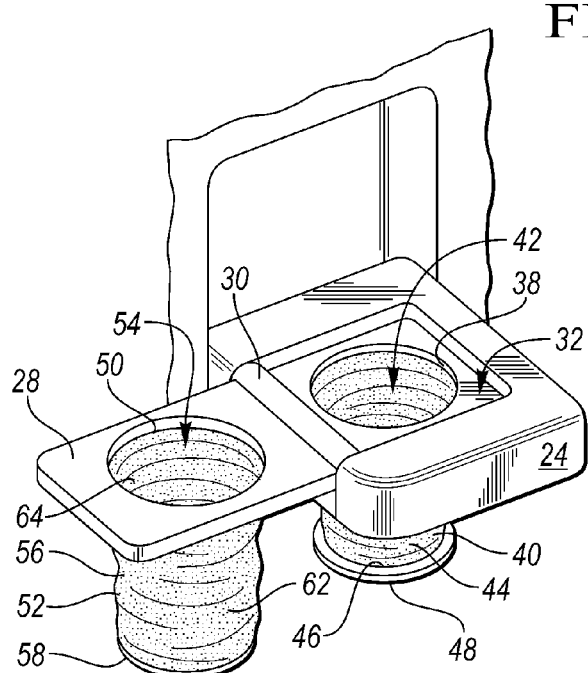
FIG. 3

CUP HOLDER ASSEMBLIES

CROSS-REFERENCE TO RELATED APPLICATIONS

This application is a division of U.S. application Ser. No. 14/628,666 filed Feb. 23, 2015, now U.S. Pat. No. 9,440,573 issued Sep. 13, 2016, the disclosure of which is hereby incorporated in its entirety by reference herein.

TECHNICAL FIELD

The present disclosure relates to cup holder assemblies for motor vehicles.

BACKGROUND

Motor vehicles typically include cup holders that provide storage areas for beverages. The cup holders are typically built into, or attached to, one or more interior components of the vehicle. In some locations, such as the rear seats, suitable locations for placing conventional cup holders are limited due to an absence of horizontal and vertical surfaces.

SUMMARY

According to one embodiment, a cup holder assembly includes a pair of planar bodies each defining a rim, and a pair of fabric pouches that are each attached to one of the rims. The planar bodies are pivotably attached to each other and are configured such that, in a folded position, the rims are stacked and the fabric pouches are nested within each other, and in a deployed position, the rims and fabric pouches are side-by-side.

According to another embodiment, a cup holder for a beverage includes a bezel that is pivotably attached to a tray and defines a hole. A reversible pouch is attached to the bezel around a periphery of the hole and includes front and back surfaces. The bezel is pivotable between a stacked position in which the front surface is arranged to contact the beverage, and a deployed position in which the back surface is arranged to contact the beverage.

According to yet another embodiment, an interior component for a vehicle includes a tray that is deployable from a panel and defines a first hole. A bezel is pivotably attached to the tray and defines a second hole. A first cup holder includes a first pouch that is attached around a periphery of the first hole. A second cup holder includes a second pouch that is attached around a periphery of the second hole. The bezel is pivotable between a deployed position in which the tray and bezel are side-by-side, and a folded position in which the bezel and tray are stacked such that the pouches are contained within the tray.

BRIEF DESCRIPTION OF THE DRAWINGS

FIGS. 1, 2, and 3 are perspective views of a cup holder assembly.

DETAILED DESCRIPTION

Figure 4:
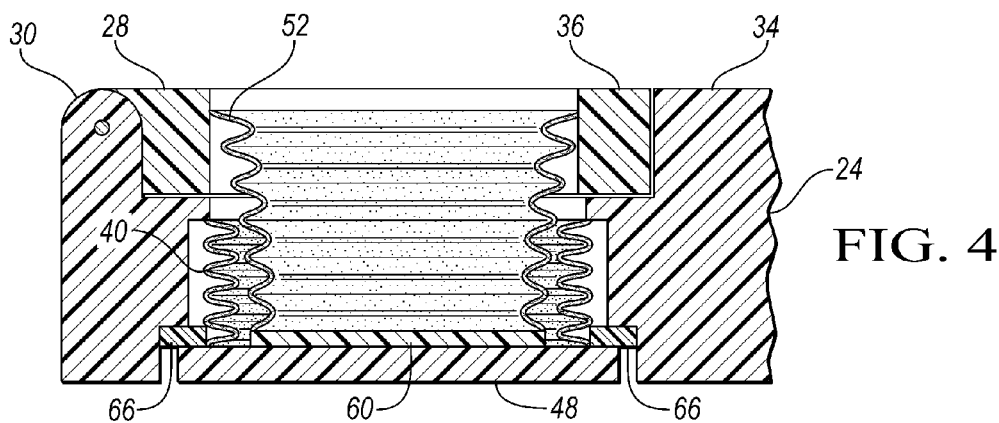
FIG. 4 is a section view along cutline 4-4.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIGS. 1 to 3, a vehicle interior component—such as a center console, seat back panel, door panel, or other trim panel—includes a vertical surface 20. A cup holder assembly 22 is disposed on the vertical surface 20. The cup holder assembly 22 may include a deployable tray 24 that is pivotally attached to the vertical surface 20 and is pivotable between an open position and a closed position. The vertical surface 20 includes a cavity 26 for receiving the tray 24 when in the closed position. The cavity 26 and the tray 24 are sized and shaped such that, in the closed position, the tray is substantially flush with the vertical surface 20. In an alternative embodiment, the cup holder 22 may slide out from the vertical surface 20 rather than fold out.

A bezel 28 is pivotally attached to the tray 24 via a hinge 30, and is pivotable between a folded position (FIG. 2) and a deployed position (FIG. 3). In the folded position, the bezel 28 is stacked on top of the tray 24. The tray 24 may include a recessed area 32 for receiving the bezel 28 when in the folded position such that surface 36 of the bezel is substantially flush with the upper surface 34 of the tray. In the deployed position, the bezel 28 is folded away from the tray 24 such that the tray and bezel are disposed side-by-side relative to each other. The tray 24 and bezel 28 may be arranged such that they are substantially coplanar in the deployed position.

The tray 24 defines a rim 38. A first pouch 40 is attached to the rim 38 along an upper end of the pouch 40. The first pouch 40 defines a beverage well 42 having an open upper end for receiving beverages. The rim 38 defines the entrance into the beverage well 42. The pouch 40 may be shaped as an open cylindrical cylinder that includes a sidewall 44 and a circular bottom 46. The pouch 40 may be sized to approximate the size of a typical beverage container. A bottom plate 48 may be attached to the circular bottom 46. The bottom plate 48 may act as a weight to help unfold the pouch and may serve as an attachment feature for holding the pouch in a stowed position to the bottom side of the tray 24. Alternatively, the pouch 40 may not include the bottom 46. Here, the bottom plate 48 defines the bottom of the beverage well 42.

The bezel 28 defines a rim 50. A second pouch 52 is attached to the rim 50 along an upper end of the pouch 52.

The second pouch 52 defines a beverage well 54. The rim 50 defines the entrance into the beverage well 54. The second pouch 52 may be shaped as a cylindrical cylinder that includes a sidewall 56 and a circular bottom 58. A second bottom plate 60 may be attached to the circular bottom 58. The second pouch 52 includes a front surface 62 and a back surface 64. Alternatively, the pouch 52 may not include the circular bottom 58 and the bottom plate 60 defines the bottom of the beverage well 54.

The pouches 40, 52 may be made of a flexible material, such as fabric, woven nylon, or Gore-Tex®. The pouches may be attached to a corresponding rim by in-molding, heat staking, sewn-in retention ring, or other similar methods. The pouches 40, 52 have a deployed position (FIG. 2 or 3) where each pouch is unfolded forming the beverage well, and a stowed position (FIG. 1) where each pouch is folded up and contained within the upper and lower surfaces 34, 35 of the tray 24. Each of the pouches may include fold lines, a spring, or similar structures to facilitate the folding of the pouches. In the stowed position, the bezel 28 is in the folded position and pouch 52 is received within pouch 40.

Referring to FIG. 2, the cup holder 22 is shown in the single-cup-holder mode. In this mode, the bezel 28 is folded on top of tray 24 and the rims 38, 50 are stacked on top of each other. The rims 38 and 50 may be concentric. The second pouch 52 is received through the rim 38, and is disposed within the first pouch 40 with the front surface 62 being the inside surface of the pouch 52 and the back surface 64 being the outside surface of the pouch 52. Both of the pouches may be pushed down, for example with a beverage, to a deployed position where the pouches cooperate forming a single beverage well.

If a greater number of cup holders is desired, the bezel 28 may be deployed—by unfolding the bezel from the tray—placing the cup holder 22 in the dual-cup-holder mode, which is illustrated in FIG. 3. Unfolding the bezel 28 from the tray 24 causes the second pouch 52 to pull out of the first pouch 40. The user may then push the second pouch 52 through the rim 50 forming the second beverage well 54. In this mode, the pouch is reversed and the back surface 64 is the inside surface of the well 54 and the front surface 62 is the outside surface of the well 54.

Referring to FIGS. 1 to 4, the operations of deploying and stowing the cup holder 22 will be described in detail. The cup holder 22 is deployed by first folding (or pulling) the tray 24 out of the vertical surface 20. Springs or other means may be used to help deploy the tray 24 from the surface 20. Next, the cup holder 22 may be used in the single cup holder mode by placing a beverage through the stacked rims 38, 50 and into the first and second pouches forming a beverage well. Or, the bezel 28 may be unfolded from the tray 24 placing the cup holder 22 in the dual cup holder mode. The first and second pouches 40 and 52 may be pushed down to a deployed position where they depend from a respective rim forming two beverage wells.

If in the dual cup holder mode, the cup holder 22 may be prepared for stowing by first folding the bezel 28 on top of the tray 24 such that the rims 38 and 50 are stacked on top of each other. The second pouch 52 is then received within the first pouch 40 such that the pouches are nested within each other. The first pouch 40 may be larger than the second pouch 52 so that the second pouch 52 easily nests within the first pouch 40. Having pouches of different sizes also accommodates beverage containers of different sizes. The first and second pouches 40, 52 may then be pushed upward causing the pouches to fold and collapse. The pouches are pushed upward until the bottom plate 48 is received within the tray 24. The tray 24 may include features that cooperate with the bottom plate 48 to retain the pouches and plates in the stowed position. For example, the bottom plate 48 may be a ferrous material and the tray 24 may include permanent magnets 66 for retaining the plate 48 in the tray 24. Alternatively, the tray 24 may include clips for retaining the bottom plate 48. Once the pouches are in the stowed position, the tray 24 may be folded into the cavity 26 of the vertical surface 20. Clips or other retaining features may be used to secure the tray in the cavity 26.

Figure 5:
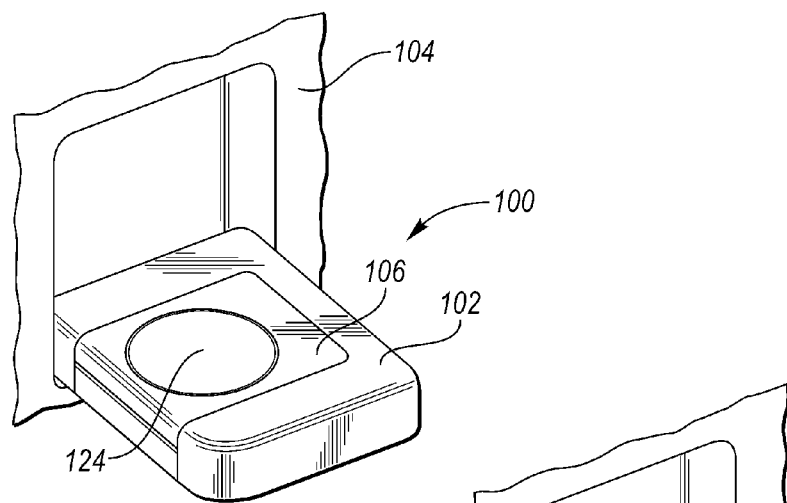
FIGS. 5 and 6 are perspective views of another cup holder assembly.
Figure 6:
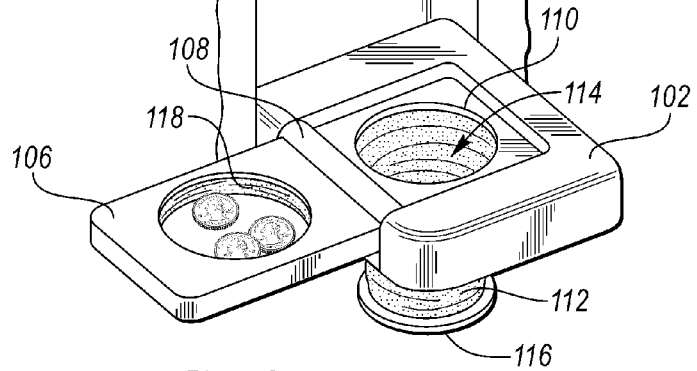
Figure 7:
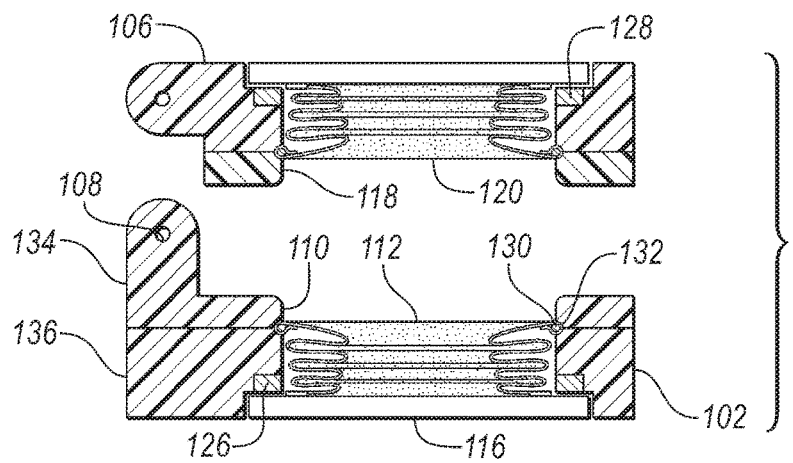
FIG. 7 is an exploded cross-sectional side view of the cup holder assembly illustrated in FIG. 5.

Referring to FIGS. 5, 6, and 7, another cup holder assembly 100 is shown. Similar to cup holder assembly 22, cup holder assembly 100 may operate in either single-cup-holder mode (FIG. 6) or dual-cup-holder mode (not shown). The cup holder assembly 100 may include a deployable tray 102 pivotally attached to a vertical surface 104 between an open position and a closed position. A bezel 106 is pivotally attached to the tray 102 between a folded position (FIG. 5) and a deployed position (FIG. 6). The bezel 106 may by attached via a hinge 108. The tray 102 defines a rim 110. A first pouch 112 is attached to the rim 110 along an upper end of the pouch. The pouch 112 defines a beverage well 114 when in the deployed position. A bottom plate 116 may be attached to the bottom of the first pouch 112. The bezel 106 defines a rim 118. A second pouch 120 is attached to the rim 118 at an upper end of the pouch. The second pouch 120 is configured to define a beverage well when in the deployed position. A second bottom plate 124 may be attached to the bottom of the second pouch 120.

When stowed, the first pouch 112 is folded into the tray 102. The tray 102 may include magnets 126 for holding the plate 116 in place. The second pouch 120 is folded into the bezel 106 when stowed. The bezel 106 may include magnets 128 for holding the plate 124 in place. In an alternative embodiment, the magnets 128 may be replaced with other securing means, such as clips. The first and second pouches 112, 120 may include devices to assist folding of the pouches as described above. When the bezel 106 is in the folded position, the bottom plate 124 spans across the rim 118 providing a smooth work surface on the tray 102 as best shown in FIG. 5. The magnets 128 may be strong enough to support items creating a shallow storage bin in the bezel 106 when the pouch 120 is in the folded position.

The pouches may be attached to a corresponding rim by in-molding, heat staking, retention rings, or other methods. For example, the pouches may include a sewn-in snap ring 130 that is received within a groove 132 defined in the rim 110. The snap ring 130 may be flexible enough to allow removal of the pouches for cleaning, repair, or replacement. Alternatively, the pouches may be sandwiched between portions 134 and 136. It is to be understood that any of the pouches can be attached by any of the methods described within this disclosure.

Figure 8:
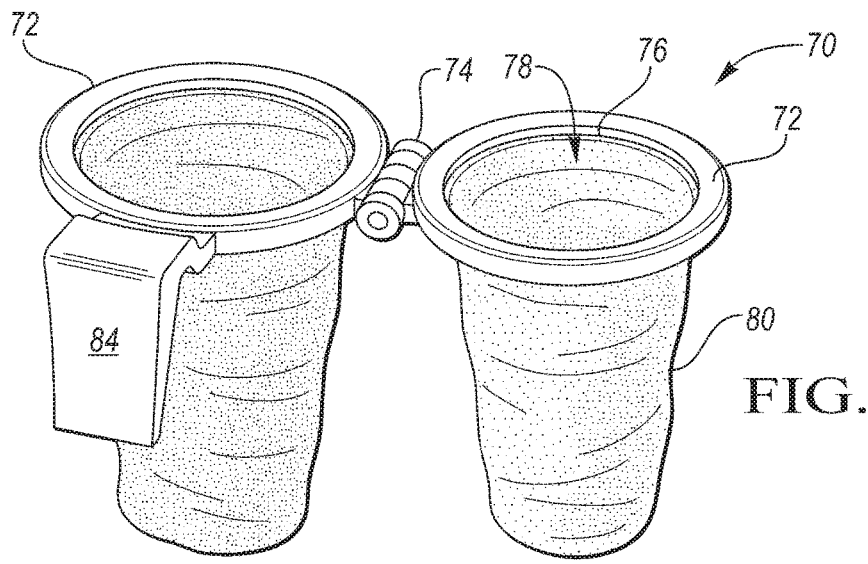
FIG. 8 is a perspective view of yet another cup holder assembly.
Figure 9:
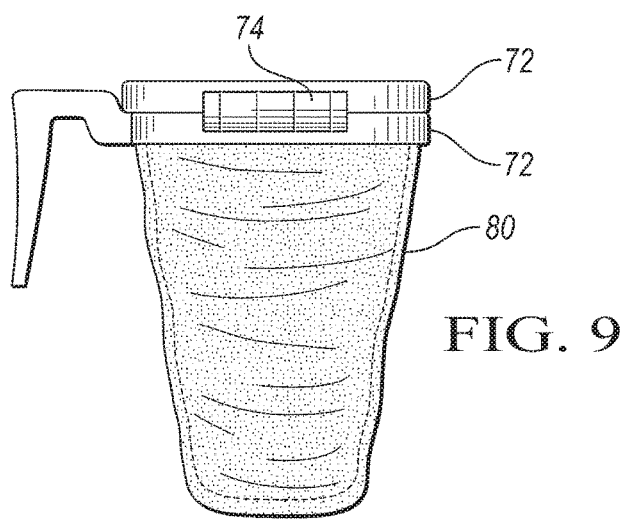
FIG. 9 is a side view of the cup holder assembly shown in FIG. 5.

Referring to FIGS. 8 and 9, another cup holder 70 includes first and second planar bodies 72 that are pivotally attached to each other via a hinge 74. Each of the planar bodies 72 define a rim 76 that forms the periphery of an opening 78. One of the planar bodies 72 includes a mounting surface 84 that is attachable to a trim component of the vehicle. The mounting surface 84 may have a dove-tail shaped tab that is receivable within a cooperating recess in one of the trim components. Alternatively, the mounting surface may be glued or fastened to the trim component.

A pair of pouches 80 are each attached to one of the rims 76. The pouches 80 may be similar to the pouches described above. The pouches include an open top allowing a beverage be received through the opening and into the pouch, and a closed bottom for supporting the beverage. One or both of the pouches may include an optional bottom plate (not shown). One of the pouches 80 may be received within the other of the pouches forming a single cup holder, or the planar bodies may be unfolded forming a dual cup holder.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A cup holder assembly comprising:
   a pair of bodies each defining a rim and having a retaining feature;
   a hinge pivotally connecting the planar bodies such that the bodies are movable between a folded position in which the rims are stacked on top of each other and a deployed position in which the rims are side-by-side, wherein one of the bodies defines a recessed area that receives the other of the bodies when in the folded position; and
   a pair of fabric pouches each attached to one of the rims and each having a metal plate, wherein each of the pouches includes a stowed position in which the pouch is folded up and contained within a corresponding one of the bodies with the metal plate secured by the retaining feature.

2. The cup holder of claim 1 wherein the retaining feature is a magnet.

3. The cup holder of claim 1 wherein the pouches form two beverage wells when side-by-side.

4. The cup holder of claim 1 wherein each of the rims are concentric when in the folded position.

5. The cup holder of claim 1 further comprising a mounting element connected to one of the bodies and configured to connect to a trim component.

6. A cup holder comprising:
   first and second bodies hingedly connected, the first body defining a recess that receives the second body when pivoted to a stacked position;
   a pair of fabric pouches each attached to one of the bodies and each having a plate; and
   first and second magnets attached to the first and second bodies, respectively, and magnetically cooperating with the plates to secure the pouches within their body when in the stacked position.

7. A cup holder assembly having an in-use position and a storage position, the cup holder assembly comprising:
   a pair of bodies each defining a rim, wherein a first of the bodies defines a recessed area that is configured to receive the second of the bodies;
   a hinge pivotally connecting the planar bodies such that the bodies are pivotal between a folded position in which the rims are stacked on top of each other with the second body disposed in the recessed area and a deployed position in which the rims are side-by-side; and
   a pair of fabric pouches each attached to one of the rims and each having a stowed position in which the pouch is folded up and contained within a corresponding one of the bodies and a deployed position in which the pouch is unfolded to depend from the corresponding one of the bodies and forms a beverage well; wherein
   the pouches are in the stowed position and the bodies are in the folded position to place the cup holder in the storage position, and the pouches are in the deployed position and the bodies are in the deployed position to form a pair of side-by-side beverage wells when the cup holder in the in-use position.

* * * * *